United States Patent
Dernebo

(10) Patent No.: US 6,467,592 B1
(45) Date of Patent: Oct. 22, 2002

(54) ARRANGEMENT FOR A PISTON AND CYLINDER DEVICE

(76) Inventor: Lars Dernebo, Granbackavägen 90, 931 42 Skellefteå (SE)

( * ) Notice: Subject to any disclaimer, the term of this patent is extended or adjusted under 35 U.S.C. 154(b) by 0 days.

(21) Appl. No.: 09/806,161
(22) PCT Filed: Aug. 9, 2000
(86) PCT No.: PCT/SE00/01560
§ 371 (c)(1),
(2), (4) Date: Mar. 26, 2001
(87) PCT Pub. No.: WO01/11254
PCT Pub. Date: Feb. 15, 2001

(30) Foreign Application Priority Data

Aug. 10, 1999 (SE) .............................................. 9902868

(51) Int. Cl.⁷ .................................................. F16F 9/44
(52) U.S. Cl. ......................... 188/278; 188/284; 188/313; 267/64.26
(58) Field of Search .................................. 188/278, 276, 188/277, 284, 289, 313, 314, 315, 322.13, 322.5, 299.1; 267/64.11, 64.15, 64.26, 136, 217

(56) References Cited

U.S. PATENT DOCUMENTS

| | | | | |
|---|---|---|---|---|
| 3,827,538 A | * | 8/1974 | Morgan | 188/319 |
| 4,749,070 A | * | 6/1988 | Moser et al. | 188/299.1 |
| 5,396,973 A | * | 3/1995 | Schwemmer et al. | 188/299.1 |
| 5,467,852 A | * | 11/1995 | de Kock | 188/322.14 |

* cited by examiner

*Primary Examiner*—Pam Rodriguez
(74) *Attorney, Agent, or Firm*—Fasth Law Offices; Rolf Fasth

(57) ABSTRACT

The hydraulic cylinder or shock absorber arrangement has a cylinder unit limiting an inner space in which a medium in the form of a gas or a liquid is intended to be placed. A forwardly and backwardly movable piston unit is placed such that it can slide within the space that is defined by the piston into a first chamber and a second chamber. An inlet/outlet is defined in the respective chambers of the cylinder unit for the addition to and removal of medium from the chambers together with devices which co-act in order to determine the relative position of the piston within the cylinder unit, an active first part of which is attached to the cylinder unit and arranged stretching into a recess that is arranged in the piston unit.

13 Claims, 3 Drawing Sheets

ARRANGEMENT FOR A PISTON AND CYLINDER DEVICE

FIELD OF THE INVENTION

The present invention concerns an arrangement for a piston and cylinder device.

BACKGROUND AND SUMMARY OF THE INVENTION

Piston and cylinder devices as such are used in a number of applications, for example in the form of positioning and manoeuvering devices such as drive cylinders in order to achieve manoeuvering movements in machines, or in the form of shock absorbers in order to absorb and dampen movements between elements that are jointed to pivot with each other. The above-mentioned types of piston- and cylinder devices, independently of whether they are designed to be used as positioning and manoeuvering devices or as shock absorbers, have in common that they display an inlet/outlet to each chamber such that the medium that is used can be added to and removed from the said chambers. However, for a shock absorber, the inlet/outlet to each chamber of the piston- and cylinder device are connected together and designed as a common channel or passage such that the medium can flow forwards and backwards between the two chambers during the forward and backwards motion of the piston device in the cylinder. On the other hand, in the type of piston- and cylinder device that is used as a drive cylinder or positioning device, the inlet/outlet of each chamber are separate from each other and are each individually in flow-through connection with an external circuit that contains, among other things, devices for the control of direction of some pressurized medium such as oil or air.

In the case of shock absorbers, the above-mentioned passage between the chambers is arranged in the actual piston device whereby the damping force that thus arises is mainly derived from the friction of the medium in the channel. The said damping force can be regulated by varying the resistance to flow or the speed and rate of flow with which the medium is allowed to flow forwards and backwards through the channel.

Recently, piston and cylinder devices have been developed with integral position-sensitive elements, that is, devices that make it possible to determine the motion of the piston device relative to the cylinder unit. The position-sensitive devices are usually connected to an external control unit, for example in the form of a computer. In the case of shock absorbers, the computer can be provided with the information that is required to control and regulate the damping properties or characteristic of the shock absorber in a way that is suitable for the application. For example, the damping force or characteristic of the shock absorber can be varied depending on the properties of the road surface, the speed, tilt, etc., or depending on parameters that are specified in advance, that is, if the vehicle is to offer a smooth and comfortable journey and thus offer high comfort for the travellers, or to allow more advanced and demanding driving. The computer can also be supplied with information about the speed, acceleration, etc., of the vehicle, in order to calculate an optimal damping characteristic of the shock absorber for the current driving conditions, based on the information that is supplied.

Shock absorbers are also known in which it is possible to measure the temperature of the medium that is exchanged between the two chambers of the shock absorber. If the properties of the medium that has been chosen to function in the shock absorber are previously known and these properties are stored in a computer, the measured temperature of the medium can be used to calculate its internal friction, or viscosity, at each instant. By regulating, based on this information, the speed and the rate of flow with which the medium is allowed to flow through the flow channel that exists between the two chambers of the shock absorber, the properties of the shock absorber can also be maintained essentially constant, independent of the temperature of the surroundings or of the shock absorber itself.

Piston and cylinder devices that are currently known have fairly complicated constructions in order to allow the medium to flow into and out from the chambers, and to make it possible to control and guide the movements of the piston and cylinder device.

One intention of the invention is to achieve a piston and cylinder device that not only makes it possible for the medium to flow into and out from the chambers, but also allows in this part control and guidance of the movements of the piston in the piston and cylinder device.

BRIEF DESCRIPTION OF THE DRAWINGS

This invention will be described in more detail in the following with reference to the attached drawings, in which.

DETAILED DESCRIPTION

Figure 1:
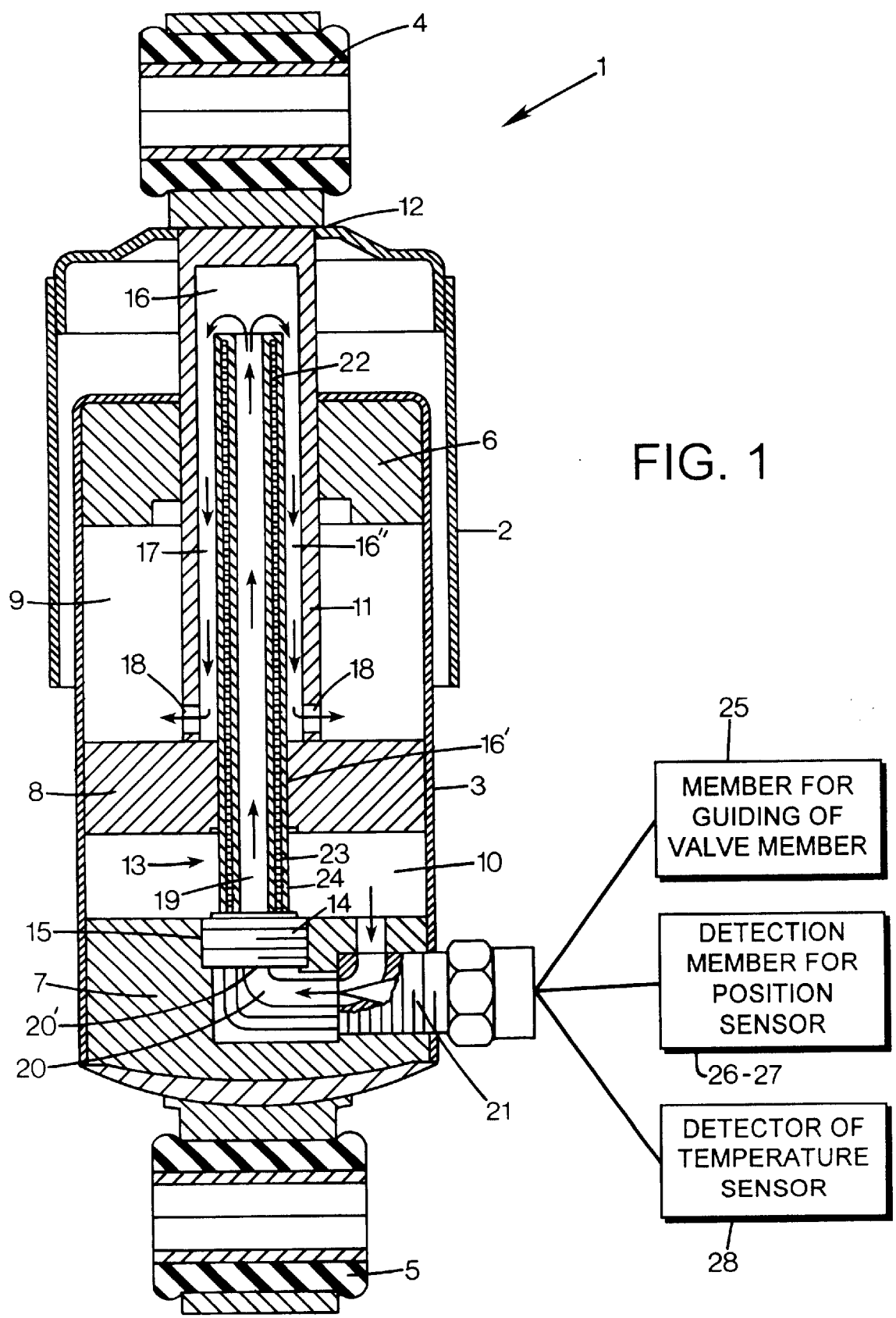
FIG. 1 shows a view in longitudinal cross-section through a shock absorber equipped with an arrangement according to the invention.

In the drawings reference numeral 1 is used to generally denote a shock absorber comprising a cup-shaped outer cylinder unit 2 and an inner cylinder unit 3 that are able to move relative to each other in an axial telescopic manner, and that are equipped at their free ends with fixtures 4 and 5, respectively, for mounting between two parts that move relative to each other, the vibrations of which are to be damped, for example the wheel axle in a vehicle body.

The inner cylinder 3 is equipped with end walls 6 and 7 and limits with respect to its longitudinal axis a cylindrical inner space that has a rotationally symmetric shape and in which is placed a damping medium, that is preferably in the form of a fluid or a liquid, and a forwardly and backwardly mobile piston device 8 that acts in the cylinder space and that makes contact in a manner that prevents fluid leakage with the inner surface of the cylinder unit 3 to divide the cylinder space into a first chamber 9 and a second chamber 10.

To one end of the piston device 8 is firmly attached one end of a piston rod 11, the second end of which stretches out through a central opening 12 in one end wall 6 of the inner cylinder unit 3 and which is sealed against the said opening 12 with respect to the fluid that is used. The outer cup-shaped cylinder unit 2 is open towards the inner cylinder unit 3 and is connected in a manner that resembles a collar in the region of transition between the piston rod 11 and the fixture 4 such that the same, during the relative motion of the said parts, surrounds that end wall 6 of the inner cylinder unit 3, from which the piston rod 11 protrudes.

The figure shows the lower end wall 7, that is, the part that faces away from the protruding end of the piston rod, is arranged an extended tube-shaped element, generally denoted by 13, that lies coaxial with the central axis of the cylinder 3. The said tube-shaped element 13 has been given a circular cross-section, and is equipped at one of its ends with a ring-shaped base part 14 that is fixed by means of a screw connection into a recess 15 in the end wall 7 that opens into the second chamber 10, and that has a second end that is placed into a recess 16 that lies along the central axis of the piston device 6 and the piston rod 11. As is shown in FIG. 1, the tube-shaped element 13 is positioned in a first section 16' of the recess 16 in a manner that prevents fluid leakage and that allows the sliding to be controlled, whereby a second section 16" of the recess 16 that lies after the first section, seen from the point of view of the piston rod 11, having a larger diameter than the first section such that a ring-shaped space 17 is defined between the outer surface of the tube-shaped element 13 and the inner surface of the second section 16" of the recess 16 when the shock absorber is placed into a fully or partially compressed state. It should be realized, if FIG. 1 is studied more closely, that the ring-shaped space 17 is thus in flow connection with the first chamber 9 of the cylinder unit 3 via openings 18 that stretch radially through the cavity wall of the piston rod 11.

The hollow inner space of the tube-shaped element 13 forms a channel 19 that runs axially, one end of which opens into the inner ring-shaped space 17 of the piston rod 11 and the second end of which can be placed in flow connection with the second chamber 10 of the cylinder unit 3 via a channel 20 that is equipped with valve devices 21 and that is arranged in the second end wall 7. As is shown in FIG. 1, the channel 20 displays an opening 20' that serves both as inlet and outlet, and opens into the said first chamber 10. The valve device 21 can be of any known type that is suitable for the purpose, and the invention provides the advantage that it can be placed in a stationary unit of the shock absorber, that is, in a unit that does not follow the motion of the piston. In the embodiment of the invention that is described here, the valve device 21 is placed in a recess arranged in the end wall 7 and attached to it by means of a screw connection.

When the valve device 21 is in an open condition, as is shown in FIG. 1, the first chamber 9 and the second chamber 10 of the cylinder unit 3 communicate with each other through the channel 19 that is formed by the hollow inner space of the element. The flow communication between the chambers 9, 10 is shown in FIG. 1 by arrows whereby the shock absorber 1, in the example that is displayed here, moves towards the compressed condition. During the motion of the piston device 3, fluid that is passing through the tube-shaped element 13 can be removed either from the first chamber 9 to the second chamber 10, or vice versa. The devices that are used for controlling the valve device 21 are generally denoted by the functional block 25 in FIG. 1, and will be described in more detail in the following. By regulating the degree of opening of the valve device 21, it follows that the rate of flow of the flowing quantity of fluid can be controlled in a simple manner. During motion of the shock absorber, fluid is continually exchanged between the chambers 9, 10 and thus the damping properties or characteristic of the shock absorber 1 can also be easily varied.

According to the principles of the invention, the tube-shaped element 13 forms part of a position-sensitive element, what is known as a "sensor device", from which information can be obtained in the form of electrical signals about physical quantities, which signals can be used to guide and control the function of the shock absorber. The sensor devices comprising detection- and sensor elements that make it possible, among other things, to determine the position at any instant of the piston device 8 or its speed within the cylinder unit 3, by the performance of motion relative to each other.

The position-sensitive sensor- and detector elements can be of any known type, but it is preferable from the point of view of function if they are of a type in which the sensing occurs without mechanical contact. It is appropriate if the sensing elements are electrically insulated from each other and that the position-sensitive detection element is so designed that it forms a measurable reactive alternating current resistance, or an impedance component, whereby the measurable reactive electrical impedance varies according to the position of the piston element in the cylinder. Further, the position-sensitive detection and sensor elements should be so designed that the electrical signal from the position-sensitive element can be led out from a stationary unit of the shock absorber, while the sensor element follows the motion of the piston unit.

With reference to FIG. 1, the tube-shaped element 13 comprising an inductor that contains an electrical conductor 22 that is wound around an inner tube-shaped empty core in order to form a coil.

In the embodiment that is described here, the tube-shaped element 13 is formed of two tubes 23, 24 that are concentrically placed with one surrounding the other, the inner one of which is manufactured from a ferromagnetic material and the outer one of which is manufactured from a non-ferromagnetic material. In order to resist the high pressures that may exist inside the cylinder unit, it is appropriate if the inner tube is manufactured from ferromagnetic steel while the second tube may be manufactured from a paramagnetic material such as stainless steel. It is appropriate if the electrical coil 22 is electrically insulated embedded between the said tubes in a suitable resin material. The axially lying hollow space of the inner tube 23 thus forms at the same time a flow connection between the first chamber 9 and the second chamber 10 of the cylinder unit 3. The outer tube 24 has an external surface that is so designed that it can be taken up into the first section 16' of the recess 16 in the cylinder device 3 in a manner that prevents fluid leakage and that allows the sliding motion to be controlled. In order to determine the position at each instant of the piston device 8 in the cylinder unit 3, the tube-shaped element 13 that has been arranged as an inductor collaborates with a sensor element that moves with the piston device 3 and the piston rod 11, which may suitably comprise the parts themselves or may be in the form of a lining of, for example, brass or aluminum, that is set into one of the parts. It is also conceivable to coat or plate the cavity wall of the recess 16 using known technology with a layer of a material that has been selected based on the design of the inductor, for example aluminum, and that influences the output signal from the inductor. It should be realized that the technology to achieve measurable electrical [signals] such as an inductance from an inductor is well known, and that the technology in itself does not form any part of the invention as such.

During the vibrational movement of the shock absorber, the tube-shaped element 13 is more or less surrounded by the parts 8, 11 that form the piston unit, whereby a measurable impedance component can be obtained from the inductor, in the form of an electrical signal, that varies depending on the position of the piston device 8 in the cylinder unit 3.

The sensor devices described above are connected to a functional block that is denoted by the reference numerals 26 and 27, that concerns the electrical circuits that are used for driving, guiding and controlling the movement parameters of a shock absorber equipped with an arrangement according to the present invention, together with another functional block denoted by the reference FIG. 28 that contains devices for measuring the temperature of the medium that flows through the said shock absorber. It should be realized in this section that the medium that flows between the chambers 9, 10 of the shock absorber passes or is led via sensor devices and that the temperature of the medium at any instant can be measured, which, however, will be described in more detail in the following.

Figure 2:
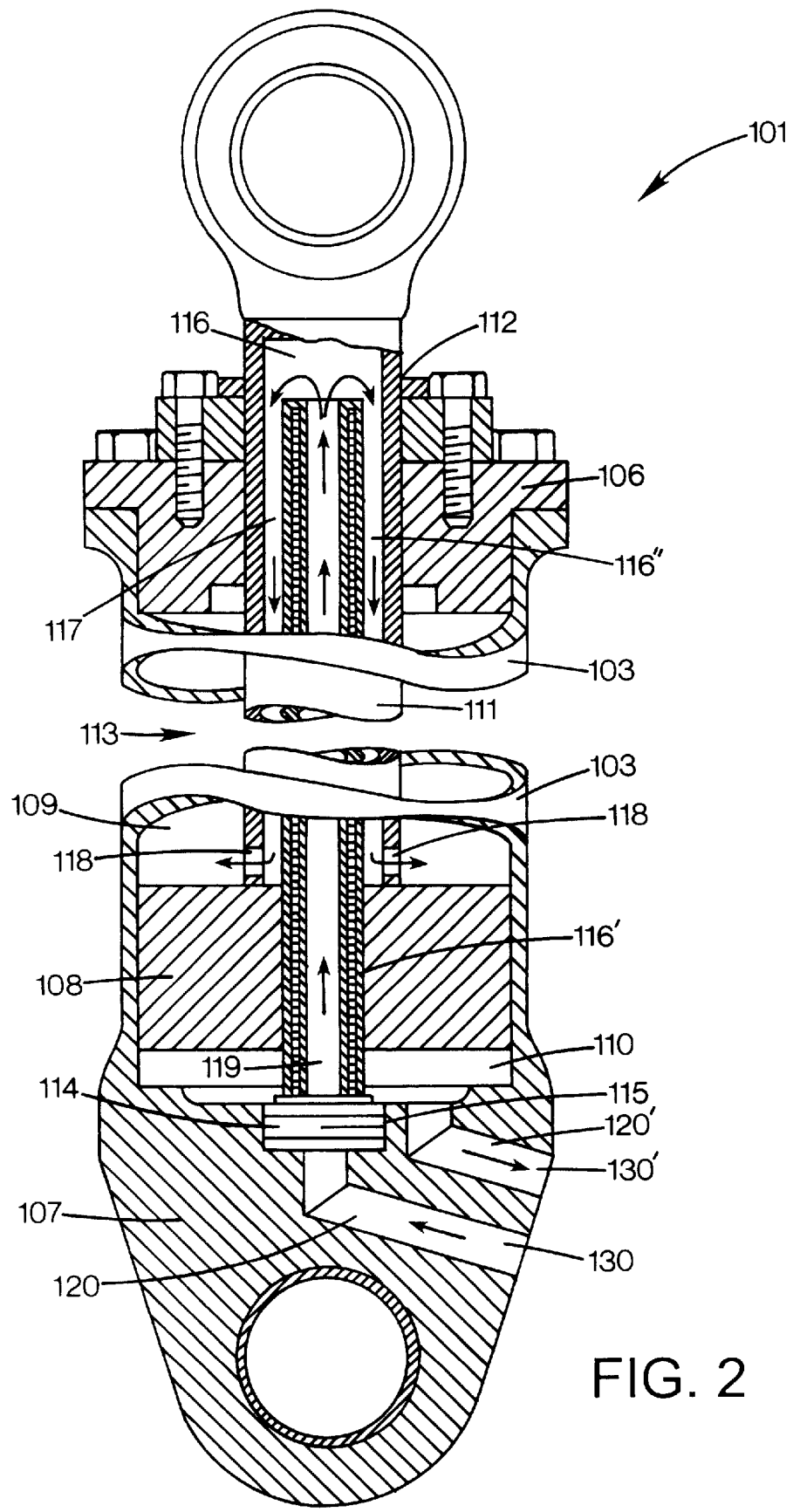
FIG. 2 shows a view in longitudinal cross-section through a drive cylinder equipped with an arrangement according to the invention.

Even if the particular embodiment of the invention that has been described here has been principally shown and described applied to a shock absorber, it should be realized that the same can be applied in an essentially equivalent manner, to, for example, a hydraulic cylinder of the type that is shown in FIG. 2.

The arrangement according to the invention is shown in FIG. 2 applied to a hydraulic cylinder whereby the value 100 has been added to those parts described above in FIG. 1 in order to make it perfectly clear that those parts that have been described above in FIG. 1 are essentially equivalent to the parts that are comprised in the said hydraulic cylinder. As FIG. 2 makes clear, the hydraulic cylinder, generally denoted by the reference figure 101, comprising a cylinder unit 103 that together with the end walls 106 and 107 limits an inner ring-shaped space in which is placed a piston unit in the form of a piston device 108, dividing the space into a first chamber 109 and a second chamber 110, together with a piston rod 111. One end of the piston rod 111 is attached to the piston device 108, while its second end protrudes from the cylinder unit 103 through an opening 112 in one end wall 106, which it penetrates in a manner that prevents fluid leakage.

Further, the piston device 108 is in known manner so designed that it can slide within the cylinder unit in a manner that prevents fluid leakage. As shown in the figure, the lower end wall 107 is arranged a tube-shaped element, generally denoted by the reference figure 113, that stretches coaxial with the central axis of the cylinder unit into a recess 116 that is arranged to run coaxial within the piston unit, in which the said tube-shaped element is placed in a manner that prevents fluid leakage and allows the sliding to be controlled into a first section 116' of the depression 116. Similar to that which has been previously described, the tube-shaped element 113 is equipped at one end with a ring-shaped base part 114 that is fixed into a recess 115 in the end wall 107 by means of a screw connection.

As is shown in FIG. 2, a ring-shaped space 117 is formed between the inner surface of a second section 116" of the recess 116 and the outer surface of the tube-shaped element 113.

The hollow space of the tube-shaped element 113 forms a channel 119 that runs axially, one end of which through openings 118, which pass radially through the wall of the piston rod 111 opens out into the said ring-shaped space 117, which in turn is placed in flow connection with the chamber 109 through which the piston rod passes. The second end of the hollow space of the tube-shaped element 113 communicates through a first channel 120 arranged in the end wall 107 with a first connection to the cylinder, defined as an inlet and outlet opening 130. The second chamber 110 of the cylinder unit communicates with a second connection 130' to the cylinder unit through a second channel 120' that is arranged in the end wall 107.

It should be realized that the piston unit that is taken up into the cylinder 101 can be manoeuvred forwards and backwards in the cylinder if the said connectors are connected to an outer circuit that comprises devices for controlling the direction of flow of a pressurized hydraulic medium. As is shown by arrows in the figure, this medium is led into one chamber 110 while at the same time being withdrawn from the second, opposite chamber 109.

Similar to that which has been described above, the tube-shaped element 113 also here forms part of a position-sensitive sensor device, the design of which is essentially equivalent to that described above.

Figure 3:
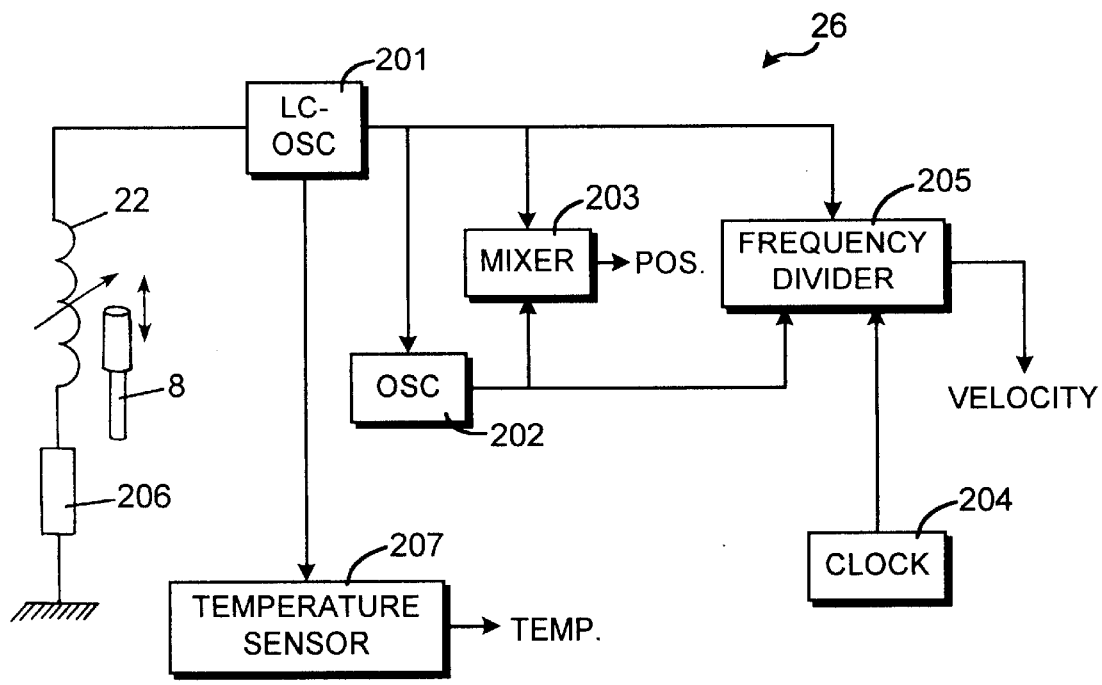
FIG. 3 shows a simplified block diagram of an electronic driving circuit that is connected to the sensor unit.

The principle for the circuit 26 that is used to drive the inductor that is attached to the tube-shaped element 13 is shown in the form of functional blocks in FIG. 3, and as the figure makes clear, a voltage supply, not shown in the figure, is fed with supply voltage, preferably between 5V and 15V, and provides in turn direct voltage to a following stage, which, in addition to a driving stage not shown in the figure, comprising an oscillator 201 of a standard type known as the "LC type" that has a variable frequency and the chosen frequency region of which is, naturally, controlled by the design of the inductor, but which normally lies in the interval from 10 kHz to 20 kHz for an inductance signal that lies in the interval between 20 nH and 50 nH. A signal known as a "positioning signal" is obtained from the LC oscillator, and varies depending on the position of the piston device 8 within the cylinder unit 3. An oscillator 102 with a fixed frequency is further connected to and driven by the voltage supply, the purpose of which is to generate a reference signal for the positioning signal that is obtained from the LC oscillator 201. The positioning signal from the LC oscillator 201 and the reference signal from the oscillator 202 are fed to a mixer 203 that converts in a known manner the frequency of the positioning signal to a lower and more practically manageable level and from which can be received a signal that corresponds to the position or state at any instant of the piston device 8 within the cylinder unit 3. Further, the positioning and reference signals from the oscillators 201 and 202 are passed, together with the signals from a clock 204, to a frequency divider 205 that generates, based on these signals, a signal that corresponds to the speed at any instant of the piston device 8 within the cylinder unit 3.

When the inductor that is attached to the tube-shaped element 13 is exposed to temperature variations, the resistance of the coil 22 that is part of the inductor changes, whereby, if these changes in resistance are measured, information about the temperature of the medium that flows between the chambers 9 and 10 in the cylinder unit 3 can be obtained, and thus also information about its viscosity. The arrangement according to the present invention has the advantage that the actual or real temperature of the medium can be sensed directly in that the medium continuously passes or is led through the inductive position-sensitive tube-shaped element 13. In this section, the current sensor denoted by the reference numeral 206 that is connected in the form of a resistor in series with the coil 22 of the inductor can be used not only to measure the position or movements of the piston in the cylinder based on the voltage drop experienced for alternating current across the winding, but also to measure the temperature of the medium that flows through the shock absorber by measuring the resistance of the winding. This temperature measurement normally occurs by the coil 22 being equipped with a further winding through which direct current is led, whereby the drop in voltage across the inductor forms a signal that is directly proportional to the temperature. As is denoted with the functional block 207 in FIG. 3, this signal is used to create a temperature signal.

Figure 4:
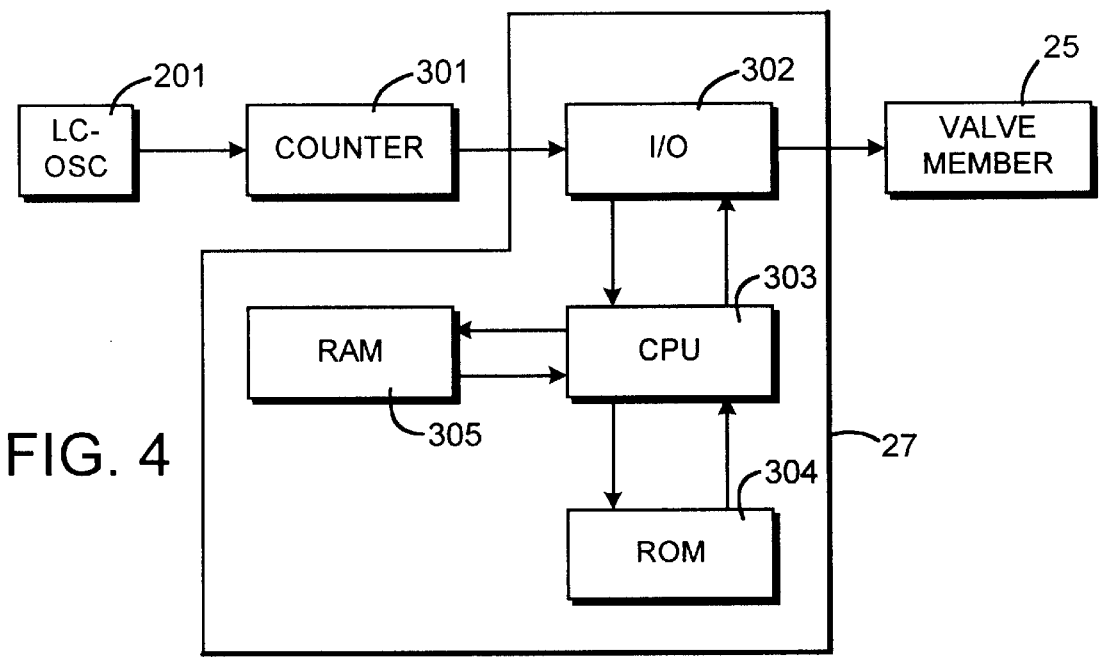
FIG. 4 shows a block diagram of the driving circuit shown in FIG. 3 in a somewhat modified and simplified embodiment.

An embodiment of the circuit shown in FIG. 3 is shown in FIG. 4 in a more practically applicable form, where the reference FIG. 27 denotes a computer control unit. As is shown by the functional blocks in FIG. 4, the positioning signal that is output from the LC oscillator 201 is received and converted by means of a counter 301 that reduces the frequency to between 5 kHz and 10 kHz, a frequency that is practically useful for the computer unit 27. The said positioning signals are passed to an electronic input/output channel, known as an "I/O unit" 302, that receives signals from a number of different sensors, providing, for example, information about the speed of the vehicle, its loading, etc. The information that is fed to the I/O unit is further passed to a programmable computer unit, known as a "CPU unit" 303, that calculates the frequency of the modified positioning signal and thus the position of the piston device 8 within the cylinder unit 3. On the basis of this, the CPU unit 303 also calculates the speed of the piston device 8 and its vibrational frequency, whereby information is received that is necessary to be able to control and regulate the damping of the vibrational motions between, for example, a wheel and a vehicle body by means of the valve devices 21 of the shock absorber 1.

It is appropriate if a computer program is arranged for the CPU unit 303 that is read as a sequence of instructions from a readable memory, known as a "ROM unit" 304, that contains one or more control programs for the shock absorber 1 determined in advance. The commands between the various units in the computer 27 occur by means of the CPU unit 303, while the I/O unit controls the balance of information that is transferred between the said CPU unit and the other components. A direct memory, known as a "RAM unit" 305, stores the data that is used by the CPU unit 303.

The CPU unit 303 processes data from the various sensors according to a program that has been determined in advance by, for example, initially determining the desired level of damping based on given parameters and regulating the control device 25 that is attached to the valve device 21 such that this level of damping is achieved. If, for example, the relative speed or the vibrational frequency between the wheel and the vehicle body deviates from a specified value, as might be the case if the speed of the vehicle increases, or if the driving conditions are influenced in a negative manner, it may be desirable immediately to increase the damping power or the damping characteristic of the shock absorber 1.

Since the CPU unit 303 can calculate the actual temperature of the damping medium and thus also its viscosity based on the signals given by the LC oscillator 201, the damping characteristic of the shock absorber can be regulated on the basis of this to a nominal value: that is, a value, for example, that corresponds to a temperature of around 20–25° C., at which the shock absorber has from the point of view of its construction been designed to work. In this way, problems associated with conventional shock absorbers, namely the problem that the damping power tends to vary with the operating temperature due to variations in the viscosity of the damping medium, can be essentially avoided.

The present invention, however, is not limited to that which is described over and shown in the diagrams. It can be changed and modified in a number of different ways within the framework of the innovative concept specified in the following claims.

What is claimed is:

1. An arrangement for a piston and cylinder device, comprising:
    a cylinder unit having an inner space defined therein, the inner space having a flowable medium disposed therein;
    a slidable piston unit disposed in the inner space, the piston unit being movable in a forward and backward direction, the piston unit dividing the inner space into a first chamber and a second chamber;
    a piston rod, connected to the piston unit;
    the piston rod having a recess defined therein, the piston rod having a first opening being in fluid communication with the first chamber;
    the cylinder unit having an end wall, the end wall having at least a part of a cylinder channel defined therein;
    a hollow sensor element disposed in the inner space and attached to the end wall, the sensor element having an axial sensor channel defined therein and extending therethrough, the sensor element being slidably associated with the piston unit and extending through the piston unit and into the recess of the piston rod, the sensor channel having a top end opening in fluid communication with the first opening and the first chamber and a bottom end opening in fluid communication with one end of the cylinder channel, the cylinder channel having an opposite end in fluid communication with the second chamber so that the medium is permitted to flow between the first and second chambers via the sensor channel and the cylinder channel;
    a conductive member disposed in the sensor element, the conductive member being connected to an electric unit for detecting an inductance; and
    a control valve in operative engagement with the cylinder channel for controlling the flow of fluid through the cylinder channel.

2. The arrangement according to claim 1, wherein the sensor element comprises an electrically active detection element that is comprised in a tube-shaped element collaborating with a sensor element that is part of the piston unit.

3. The arrangement according to claim 2, wherein the sensor element is connected to position sensitive detection devices that preferably consist of electrical circuits and a computer unit.

4. The arrangement according to claim 2 wherein the sensor element comprises an inductive functioning sensor device formed by an electrical conductor that has been wound into a coil form that lies in the longitudinal direction of the tube-shaped element whereby the piston unit forms the sensor element co-acting with, and shielded by, the coil.

5. The arrangement according to claim 4, wherein the piston unit for formation of the sensor element is manufactured from a ferromagnetic material or is designed as a coating of ferromagnetic material arranged in the recess defined in the piston rod.

6. The arrangement according to claim 5, wherein the tube shaped element contains two concentric tubes, one of which surrounds the other, between which tubes is placed the electrical conductor that has been wound into a coil form.

7. The arrangement according to claim 6, wherein the tube shaped element is connected to one end wall of the cylinder unit.

8. The arrangement according to claim 1, wherein the first and second chambers of the cylinder unit are arranged to be in contact with each other by the valve.

9. The arrangement according to claim 8, wherein the valve is connected to the cylinder channel for control and regulation of the degree of opening of the same.

10. The arrangement according, to claim 9, wherein the valve is in operative engagement with the sensor element and that the degree of opening of the valve is controlled and regulated on the basis of signals and data that are received from the sensor element.

11. The arrangement according to claim 1 wherein the arrangement further comprises devices for measuring and registering the temperature of the medium that functions in the cylinder unit.

12. The arrangement according to claim 11, wherein a temperature measuring device is connected to sensor element for control and regulation of the degree of opening of the valve.

13. The arrangement according to claim 11 wherein the temperature sensing devices comprises an electrical measurement circuit to which an electrical conductor wound into the form of a coil is connected.

\* \* \* \* \*